United States Patent Office 2,976,278
Patented Mar. 21, 1961

2,976,278

PROCESS FOR THE MANUFACTURE OF CARBOXYMETHYL CELLULOSE INVOLVING 3-COMPONENT, 2-PHASE LIQUID REACTION MEDIUM

Osborne H. Paddison, Tenafly, and Roy W. Sommers, Pennsville, N.J., assignors to E. I. du Pont de Nemours and Company, Wilmington, Del., a corporation of Delaware No Drawing. Filed Oct. 1, 1956, Ser. No. 612,924

6 Claims. (Cl. 260—231)

The present invention relates to an improved process for preparing cellulose ethers. More particularly, the present invention provides a method of preparing water-soluble alkali salts of carboxymethyl cellulose characterized by a high reaction efficiency and uniformity of etherification.

This application is a continuation-in-part of our prior copending application, Serial No. 316,074, filed October 21, 1952, now abandoned.

In the production of alkali salts of carboxymethyl cellulose, a purified cellulose is reacted with an etherifying agent in the presence of caustic alkali. In the conventional methods of manufacture, the ingredients are intermingled in the presence of a relatively small amount of liquid, and the etherification takes place in either the mixing apparatus or suitable aging containers, depending upon the manner in which the temperature is controlled.

The degree of substitution, the solution viscosity, the uniformity of substitution and several other factors all have an important bearing on the effectiveness of the product in end use applications. Thus, the cellulose ether may be water-soluble or soluble only in alkaline solutions or in organic solvents, have a high viscosity or a low viscosity, and be uniformly soluble to yield clear solutions, or have unreacted fibers yielding hazy solutions. Each of these characteristics is determined by the choice and amounts of ingredients used, the process steps employed, and the efficiency of the reaction.

The solubility of an alkali metal carboxymethyl cellulose is largely determined by both the degree of substitution and the uniformity of the substitution. The degree of substitution is defined as the average number of ether groups replacing the hydrogen in the hydroxyl groups per anhydroglucose unit. Ethers having a degree of etherification of less than 0.3 are considered to be water insoluble, while those having a higher degree of etherification may be more or less completely water-soluble, depending upon the uniformity of the etherification. At degrees of etherification higher than about 2.0, these ethers become soluble in organic solvents.

It has long been recognized that uniform distribution of the reactants during the etherification of the cellulose would produce a more uniform product, thereby producing a completely water-soluble product even at relatively low degrees of substitution. Since the degree of substitution is directly influenced by the amount of etherifying agent present and utilized in the reaction, uniform substitution is highly desirable from an economic standpoint.

In general, uniform distribution of the ingredients is difficult to obtain when only a small ratio of liquid to cellulose is utilized in the mixing step. This is particularly true since the etherification reaction is exothermic, and the heat generated thereby must be quickly dissipated, thus adversely restricting the size and nature of the mixing equipment. While this difficulty has long been recognized by the prior art, and many attempts have been made to overcome the problem, none have met with outstanding success.

A certain amount of water is required in order to provide the initial swelling of the cellulose in the presence of free alkali, and to carry the etherifying agent into the cellulose fiber or granule. If this quantity of water is increased above certain limits, the soluble ether formed by the reaction immediately produces a gummy, unworkable mass which prevents satisfactory reaction and further mixing. It has been found that the formation of this gummy mass can be retarded by including a substantial proportion of an alcohol such as ethanol in the reaction zone. Unfortunately, however, the etherifying agents and the caustic are soluble in the aqueous alcohol solution, and, as the liquid to cellulose ratio is increased, the reaction efficiency decreases rapidly. In U.S. Patent 2,517,577, it is disclosed that the reduction in reaction efficiency is not as severe if isopropanol or tert. butyl alcohol is substituted for ethanol. Attempts to increase the liquid ratio by adding a water immiscible liquid in place of the alcohol have similarly been unsatisfactory, since the immiscible liquid failed to prevent gelling as the ether was formed. Water-miscible alcohols also aid in the wetting of the cellulose starting material, thereby fascilitating penetration of the water caustic mixture.

It is an object of the present invention to provide a method for the uniform etherification of cellulose. A further object of the present invention is to provide a process for the preparation of water-soluble alkali metal carboxymethyl cellulose of relatively uniform substitution. Additional objects will become apparent as the invention is further described.

We have found that the foregoing objects may be attained by reacting a purified cellulose with an etherifying agent in the presence of caustic alkali and in a three-component, two-phase liquid medium composed of water, an inert organic liquid miscible with water, and an inert organic liquid substantially immiscible with water, the ratio of liquid to cellulose being sufficiently large to permit the formation of a slurry.

In describing a cellulose ether and the processes used in preparing such ether, certain terms have been utilized by the art. Throughout this description, the terms have the following connotation:

Degree of etherification—D.E.—the actual degree of substitution obtained as determined by an analysis of the product, i.e., the average number of ether groups which have been introduced per anhydroglucose unit of the cellulose molecule;

Theoretical degree of etherification—T.D.E.—the number of mols of etherifying agent, added to the reaction mixture, per anhydroglucose unit;

Reaction efficiency—R.E.—the ratio of the actual degree of etherification to the theoretical degree of etherification, expressed as percent.

Thus:

$$R.E. = \frac{D.E.}{T.D.E.} \times 100$$

The theoretical degree of etherification thus indicates the molar ratio of the etherifying agent to the cellulose present in the reaction mixture, while the degree of etherification is used in classifying the ether with regard to solubility in water, aqueous alkali solutions, etc.

The following examples illustrate specific embodiments of the process in accordance with the present invention, the ingredients being given as parts by weight.

*Example I*

62.5 parts of 60 mesh purified cotton linters (4.2% moisture) were added to 317.2 parts of ethanol (92.4% by weight) and 310.2 parts of toluene in a mixer, and agitation commenced, 81.1 parts of aqueous caustic solution (44.8% NaOH) were added over a period of about one minute, and the mixture was steeped at a temperature of 30° C. for 30 minutes. 35.4 parts of solid monochloroacetic acid were then added, and the reaction mixture was maintained at 65° C. for a period of 70 minutes with constant agitation. The excess caustic was neutralized with glacial acetic acid.

The product was filtered and washed three times with 65% aqueous ethanol and once with 92.4% aqueous ethanol, and dried. Upon analysis, the product thus obtained had a D.E. of 0.79. Based on a T.D.E. of 1.01, the reaction efficiency of the process was 78.2%. The solubility of the product in water was excellent, forming a clear solution, a 1% solution having a viscosity of 1,300 centipoises.

Example II 62.6 parts of 60 mesh purified wood pulp (4.2% moisture were agitated with 328 parts of ethanol, 92.4 by weight), 304 parts of benzene and 7.8 parts of water. While agitation continued, 65.2 parts of 50% aqueous caustic were added, and the slurry was steeped for 30 minutes at 30° C. 35 parts of monochloracetic acid (solid form) were added, and agitation of the mixture continued for 70 minutes at 65° C. After filtering, washing, and drying, the product was found to have a D.E. of 0.78, and, based on a T.D.E. of 1.0, the reaction efficiency of the process was 78%. The product was soluble in water, a 2% solution being clear and having a viscosity of 414.2 centipoises.

Example III

Following the procedure described in Example II, except that 292.5 parts of ethanol (92.4%), 337.5 parts of xylene, and 6.8 parts of water constituted the liquid medium, and 71.2 parts of 50% sodium hydroxide solution and 35 parts of solid monochloroacetic acid were added at the respective steps, after etherifying at 65° C. for a period of 70 minutes, the product had a D.E. of 0.75, and, based on the T.D.E. of 1.0, the process had a reaction efficiency of 75%.

Example IV

Following the procedure described in Example I, using purified wood pulp and identical proportions of the remaining ingredients except that the amount of caustic solution was reduced to 50.4 parts of 50% solution, the monochloroacetic acid reduced to 8.5 parts, and 25.5 parts of water were added, a product having a D.E. of 0.19 was obtained. Based on T.D.E. of 0.24, the reaction efficiency was 78.2%.

A 5% solution in 7% aqueous alkali gave a clear solution which was prepared at room temperature.

Example V 499 parts of the filtrate obtained upon separating the reaction mixture described in Example III were fortified with 67.2 parts of xylene, 1.6 parts water, and 75.4 parts of 100% ethanol. 62.6 parts of cellulose (4.2% water) was stirred in, and 69.6 parts of 50% caustic solution was then added, and the mixture steeped at 30° C. for thirty minutes. 35 parts of solid monchloracetic acid was added, and the slurry was agitated for 70 minutes at a temperature of 65° C. After neutralization, the slurry was filtered and the product washed and dried.

The product had a degree of etherification of 0.74; based on a T.D.E. of 1.0, the reaction efficiency was 74%. The product was readily soluble in water; a 2% solution was clear and had a viscosity of 257 centipoises.

Example VI 62.8 parts of 60 mesh-purified wood pulp (5.0% moisture) were agitated with 326 parts of ethanol (92.4% by weight), 302 parts of benzene and 11 parts of water. While agitating 65.2 parts of 50% aqueous caustic were added and slurry steeped for 30 minutes at 30° C. 35 parts of monochloroacetic acid (solid form) were added and agitation of the mixture continued for 65 minutes at 65° C. After neutralizing, filtering, washing with 65% aqueous ethanol and drying, the product was found to have a D.E. of 0.72 with a reaction efficiency of 72% based on a T.D.E. of 1.00. The product was soluble in water, a 1% solution being clear and having a viscosity of 58 centipoises. The 2% solution in water also was clear and had a viscosity of 1010 centipoises.

Example VII 451 parts of filtrate obtained upon separating the reaction mixture described in Example VI were fortified with 93 parts of benzene and 100 parts of 92.4% ethanol. 62.8 parts of 60 mesh purified wood pulp (5.0% moisture) was stirred in and 65.2 parts of 50% caustic solution was then added and the mixture steeped at 30° C. for thirty minutes. 35 parts of solid monochloroacetic acid were added and the slurry agitated for 65 minutes at a temperature of 65° C. After neutralization the slurry was filtered and the product washed and dried. The product had a D.E. of 0.72 with a reaction efficiency of 72% based on a T.D.E. of 1.00. The product was water-soluble giving clear solutions at both 1 and 2% concentrations. The viscosity of a 1% solution was 83 centipoises and the viscosity of a 2% solution was 1260 centipoises.

Example VIII

Following the procedure described in Example VII, using 452 parts of the filtrate from Example VII and using identical proportions of ingredients, a product having a D.E. of 0.72 was obtained. The reaction efficiency was 72% based on a T.D.E. of 1.00. The product was water-soluble and gave clear solutions at both 1 and 2% concentrations. The viscosity of a 1% solution was 66 centipoises and the viscosity of a 2% solution was 1060 centipoises.

Example IX

Following the procedure described in Example VII, using 455 parts of the filtrate from Example VIII, and using identical proportions of ingredients a product having a D.E. of 0.74 was obtained. Based on a T.D.E. of 1.00, the reaction efficiency was 74%. The product was soluble in water, giving clear solutions at both 1 and 2% concentrations. The viscosities of the 1 and 2% solutions were, respectively, 50 and 1180 centipoises.

Example X

Following the procedure described in Example VII, using 455 parts of the filtrate from Example IX and using identical proportions of ingredients a water-soluble product having a D.E. of 0.71 was obtained. The reaction efficiency was 71% based on a T.D.E. of 1.00 and the viscosities of 1 and 2% solutions in water were 60 and 1280 centipoises, respectively.

Example XI 61.5 parts of purified granulated wood pulp (2.2% moisture) were agitated with 190 parts of isopropanol (96.8% by weight) and 119.5 parts of toluene. While agitating, 40.5 parts of water and 28.25 parts of flake caustic were added and slurry steeped for 25 minutes at 30° C. 31 parts of monochloroacetic acid (solid form) were added and agitation of the mixture continued for 10 minutes at 35° C. After aging, the mixture was neutralized, filtered, washed with 65% aqueous ethanol, and dried. The product had a D.E. of 0.75 with a reaction efficiency of 75% based on a T.D.E. of 1.00. The product was soluble in water, a 1% solution being clear and having a viscosity of 21.5 centipoises. The 2% solution in water was also clear and had a viscosity of 138 centipoises.

Example XII 105.2 parts of purified granulated wood pulp (5% moisture) were agitated with 328 parts of isopropanol (95.9% by weight), 204 parts of toluene, and 17.7 parts of water. While agitating, 96.2 parts of 50% sodium hydroxide solution were added and slurry steeped for 25 minutes at 30° C. 52.8 parts of monochloroacetic acid (solid form) were added and agitation of the mixture continued for 10 minutes at 35° C. After aging, the mixture was neutralized, filtered, and washed with 65% aqueous ethanol, and dried. The product had a D.E. of 0.72 with a reaction efficiency of 72% based on a T.D.E. of 1.00. The product was water-soluble, a 1% solution being clear and having a viscosity of 15 centipoises. The 2% solution in water was also clear and had a viscosity of 97 centipoises.

*Examples XIII*

105.2 parts of purified granulated wood pulp (5% moisture) were agitated with 315 parts of isopropanol (95.5% by weight) and 204 parts of toluene. 117.2 parts of an aqueous solution containing 3% sodium hypochlorite, 44% sodium hydroxide, 2.35% sodium chloride were added, and the mixture slurry steeped at 37° C. for 30 minutes. 58.3 parts of crystalline monochloroacetic acid were then added and the reaction mixture agitated for 45 minutes at 65° C. The slurry was cooled to 35° C., neutralized, filtered, and the solid material washed with 65% aqueous ethanol and dried. The product had a D.E. of 0.79 with a reaction efficiency of 79% based on a T.D.E. of 1.00. The product was water-soluble, giving a clear solution. A 6% solution in water gave a viscosity of 210 centipoises.

*Example XIV*

62.8 parts of purified granular wood pulp (5% moisture) were agitated with a mixture of 24.8 parts of ethanol (92.4% by weight), and 614.8 parts of hexane. While agitating, 65.2 parts of a 50% sodium hydroxide solution were added and the mixture slurry steeped at 30° C. for 30 minutes. 35 parts of crystalline monochloroacetic acid were added and the mixture agitated at 57° C. for 70 minutes. The slurry was neutralized, filtered, and the product washed with aqueous ethanol and dried. The product had a D.E. of 0.74 with a reaction efficiency of 74% based on a T.D.E. of 1.00. The product was water-soluble, and a 2% aqueous solution had a viscosity of 1070 centipoises.

The liquid components consisting of water, and inert organic liquid miscible with water, and an inert organic liquid substantially immiscible with water, when admixed formed two distinct phases. The first phase contains a predominating proportion of water and a portion of the inert organic liquid miscible with water, while the second phase contains substantially all of the water-immiscible inert organic liquid and the remainder of the water and the water-miscible liquid. Obviously, traces of the water-immiscible inert organic liquid will be found in the first phase, but for all practical purposes, the three components are present in the two distinct phases. The ratio of one component to the other component of each phase depends upon the proportion of each of the liquids present, and also upon the solid reactants dissolved therein, and can be plotted to produce the typical binodal curve.

Both sodium hydroxide and sodium monochloroacetate are highly soluble in water, and less soluble in organic liquids. Therefore, the alkali and the etherifying agent tend to concentrate in the water-containing phase. Also, cellulose has the power to selectively absorb water from the mixture.

By employing a three-component, two-phase liquid medium, wherein the composition is so adjusted that the small water-rich phase is almost completely absorbed by the cellulose, the water-soluble reactants dissolved therein are concentrated at the cellulose interface to produce a uniformly etherified cellulose and obtain maximum utilization of the etherifying agent. It will be noted from the examples that the reaction efficiency obtainable by the present process lies between about 70 and 90%. The clarity of the solutions formed indicates the degree of uniformity of the etherification. The low substituted product of Example IV is an excellent illustration of the superiority of the present process since the literature indicates that an ether of this degree of etherification (0.19) is normally soluble only in an alkaline solution chilled below room temperature.

In order to secure the high reaction efficiencies, uniformity of substitution, and other benefits conferred by the present invention, it is necessary that mixing of the cellulose with the caustic be effected in the 2-phase, 3-component medium. The latter makes possible a more extensive and uniform contact between the cellulose and the caustic in much the same fashion as occurs with the etherifying agent. The high reaction efficiencies and superior products which are otherwise obtainable by the process of the present invention cannot be obtained if the caustic is first kneaded into the cellulose, as in a dough operation, and the alkali cellulose thereafter etherified in the 3-component medium.

After the etherification has been completed, the reaction mixture may be filtered or centrifuged to separate the liquid and solid portions. The solid cellulosic portion retains most of the water and reaction salts while the liquid recovered is the organic-rich phase which can be reused directly without rectification. If a technical grade of sodium carboxymethyl cellulose is desired, the requirement of solvent recovery is thus eliminated. In the cases where a refined grade of ether is sought, the rectification load is reduced to recovering the alcohol used in the washing operations.

In general, effective etherification may be obtained with a liquid medium consisting of water, a water-miscible organic liquid, and an organic liquid which is partially or totally immiscible with water, whenever the phase separation in the presence of the reactants occurs in accordance with the following:

(a) The etherifying agent is more highly soluble in the water-rich phase than in the organic-rich phase.

(b) The phase relationship (binodal curve and tie lines) of the system permits the size and composition of the water-rich layer to be adjusted so that adequate water is provided for uniform swelling of the cellulose without gelation. This means that the water-rich phase at normal liquid ratios must either be small compared to the total liquid present, or must contain sufficient quantities of the water-miscible component to moderate gelation.

(c) The organic-rich phase does not dissolve large quantities of water and/or dissolved reactants or salts formed during the reaction.

High reaction efficiencies appear to be obtainable only in mediums which effect a concentration of water and the reactants at the cellulose interface. The degree of etherification increases as the water content is decreased, all other ingredients being present in the same proportions, until either the total water content or the degree of distribution proves insufficient to allow proper swelling of the alkali cellulose. In order to have sufficient liquid present for a slurry process, and to permit uniform distribution of the ingredients and good control of the temperature, it is necessary to have a total liquid to cellulose ratio of at least 4 to 1 by weight. The upper limit of liquid to cellulose ratio is dictated primarily by the apparatus used and the economics involved in handling large quantities of the liquid, provided that the binodal curve of the composition selected is such that the water-rich layer may be maintained relatively small.

For all practical purposes, a liquid to cellulose ratio of 20/1 would constitute the highest feasible ratio. The ratio selected depends upon the type of cellulose used, the liquids involved, and the nature of the mixing equipment. The optimum ratio for use with cut cellulose is about 11.25 to 1.

Regardless of the total quantity of liquid present in the system, the ratio of the weight and composition of the water-layer to the weight of the cellulose at the start of the etherification should be maintained within certain limits. Satisfactory water-soluble sodium carboxymethyl cellulose can be made in a slurry medium containing from 0.03 part to 3.4 parts by weight of water in the aqueous phase per part of dry cellulose. The preferred ratio is within the range of 0.24 to 0.85 part of water in the aqueous phase per part of dry cellulose. The above ratios all refer to ingredient ratios at the beginning of the reaction and do not include the water formed during etherification or the water in the organic-rich phase.

In addition to the limitations out lined above, it is critical that the water-miscible alcohol comprise at least about 7% by weight of the total liquid present in the reaction medium. Though this appears to be a critical feature of the invention, we are not absolutely certain of the reason for it. In addition to retarding gumming of the cellulose ether formed, the alcohol apparently serves as a wetting agent to facilitate penetration of the water, caustic, and etherifying agent rather than permitting concentration thereof at the surface of the cellulose. In this latter regard, it is necessary that at least 7% by weight of the total liquid present be the alcohol, or the full advantages of the present invention will not be obtained.

For the organic, water-miscible component of the liquid medium of the present invention, we prefer to use an aliphatic alcohol having from two to four carbon atoms. The preference is based on the availability of these liquids, their relatively low cost, and the ease with which they can be removed and recovered from the product. Similarly, the preferred inert organic water-immiscible liquid is one having a boiling point of more than 35° C. such as benzene, toluene, or xylene. In order to have utility in the present process, it is not essential that the water miscible organic liquid have infinite miscibility, nor that the water-immiscible organic liquid be completely so; therefore, the terms as used throughout this description include those liquids which are substantially miscible or immiscible with water at the temperature encountered in the course of the etherification reaction.

When the liquid-to-cellulose ratios are changed, it is necessary to adjust the overall liquid composition, so that the ratio of the weight and composition of the water layer to the weight of the cellulose at the start of the etherification is maintained approximately constant.

While the invention has been described in detail in the foregoing, it is to be understod that we intend to be limited only by the following claims.

We claim:
1. In the process of preparing an alkali metal salt of carboxymethylcellulose wherein cellulose is etherified in the presence of caustic alkali with a compound selected from the class consisting of monochloroacetic acid and the alkali metal salts thereof, the improvement which comprises contacting said cellulose with said caustic alkali in a 3-component, 2-phase liquid reaction medium in which one liquid phase consists essentially of mixture of water and a water-miscible aliphatic alcohol having from 2 to 4 carbon atoms, and the second liquid phase consists essentially of an inert water-immiscible organic liquid and an additional amount of said water-miscible aliphatic alcohol, the ratio of total liquid by weight in said reaction medium to dry cellulose being at least about 4:1 but not exceeding about 20:1 the ratio of water by weight in the water-alcohol phase to dry cellulose at the beginning of the reaction being in the range of about 0.03:1 to about 3.4:1, the total amount of said water-miscible aliphatic alcohol in the reaction medium constituting at least about 7% by weight of the total weight of the liquid in the reaction mixture at the start of the reaction, and subsequently effecting etherification in said 3-component, 2-phase liquid reaction medium.

2. A process as claimed in claim 1, wherein the alcohol is ethanol and the water-immiscible liquid is toluene.

3. A process as claimed in claim 1, wherein the alcohol is ethanol and the water-immiscible liquid is benzene.

4. A process as claimed in claim 1 wherein the alcohol is ethanol and the water-immiscible liquid is xylene.

5. In the process of preparing an alkali metal salt of carboxymethyl cellulose wherein cellulose is etherified in the presence of caustic alkali with a compound selected from the class consisting of monochloroacetic acid and the alkali metal salts thereof, the improvement which comprises contacting said cellulose with said caustic alkali in a 3-component, 2-phase liquid reaction medium in which one liquid phase consists essentially of a mixture of water and a water-miscible aliphatic alcohol having from 2 to 4 carbon atoms and the second liquid phase consists essentially of an inert water-immiscible organic liquid and an additional amount of said water-miscible aliphatic alcohol, the ratio of total liquid by weight in said reaction medium to dry cellulose being at least about 4:1 but not exceeding about 20:1, the ratio of water by weight in the water-alcohol phase to dry cellulose at the beginning of the reaction being in the range of about 0.03:1 to about 3.4:1, the total amount of said water-miscible aliphatic alcohol in the reaction medium constituting at least about 7% by weight of the total weight of the liquid in the reaction mixture at the start of the reaction, and subsequently effecting etherification in said 3-component, 2-phase liquid reaction medium, the water-alcohol phase serving to swell the cellulose and carry the reactants into intimate contact therewith and the water-immiscible organic liquid phase serving as an inert diluent to maintain the reaction medium in slurry form.

6. The process of preparing an alkali metal salt of carboxymethyl cellulose which comprises agitating cellulose, free alkali and monochloroacetic acid in a liquid medium comprising water, a water-immiscible inert organic liquid, and a water-miscible aliphatic alcohol of 2–4 carbon atoms, the resulting ether product remaining in a solid undissolved state in the reaction mixture until recovered, said organic liquid and said alcohol being present from the beginning of the process.

References Cited in the file of this patent

UNITED STATES PATENTS

| | | |
|---|---|---|
| 1,884,629 | Dreyfus | Oct. 25, 1932 |
| 2,096,681 | Lorand | Oct. 19, 1937 |
| 2,181,264 | Dreyfus | Nov. 28, 1939 |
| 2,517,577 | Klug et al. | Aug. 8, 1950 |
| 2,524,024 | Swinehart et al. | Sept. 26, 1950 |

FOREIGN PATENTS

| | | |
|---|---|---|
| 526,370 | Great Britain | Sept. 17, 1940 |